May 14, 1940.　　C. A. VAN DERVEER ET AL　　2,200,904
REVOLVING CAR SEAT
Filed June 7, 1937　　6 Sheets-Sheet 1
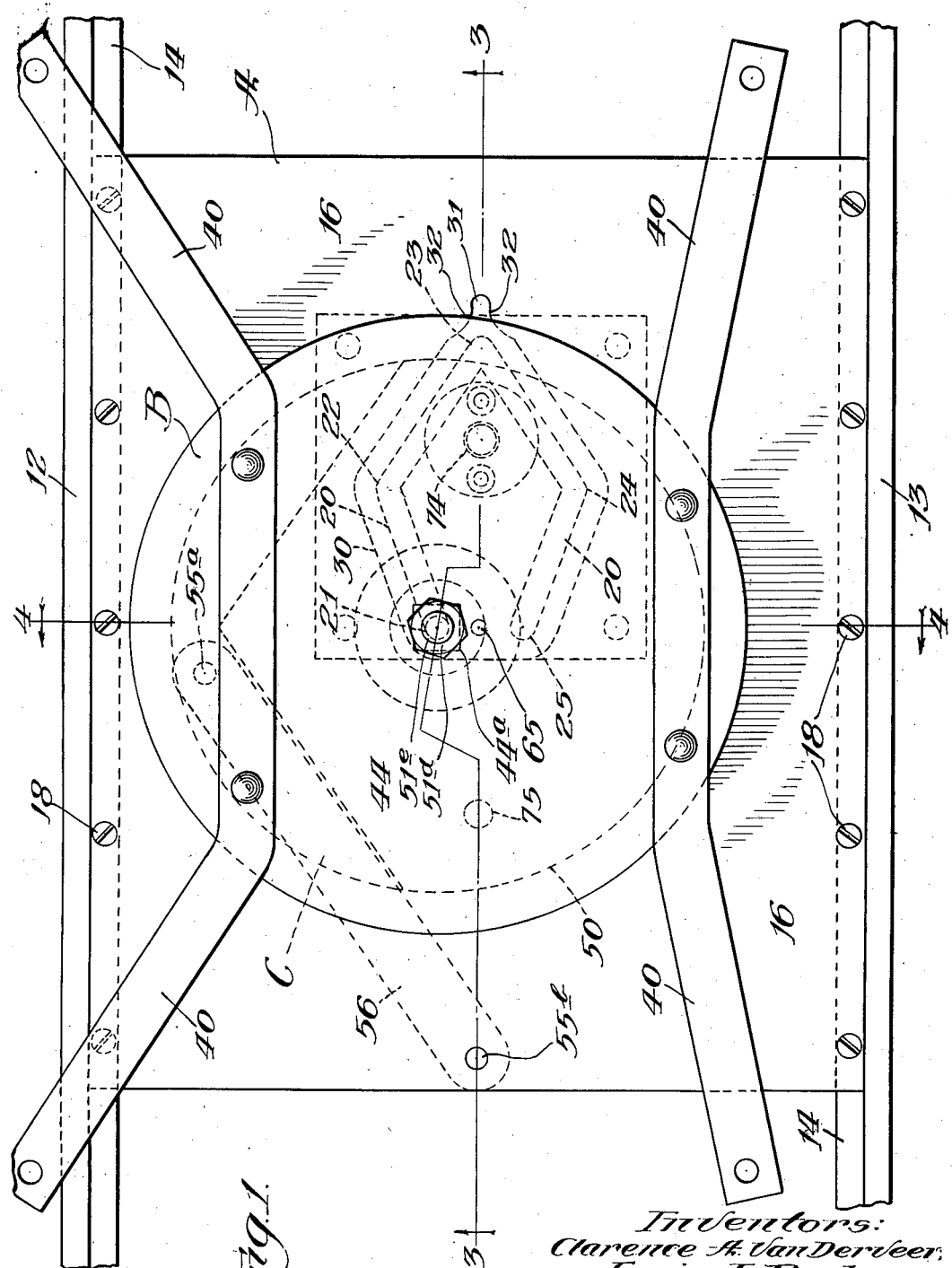
Inventors:
Clarence A. Van Derveer,
Ernie J. Beck.
By Chritton, Wiles, Davis, Hirsch & Dawson
Attorneys.

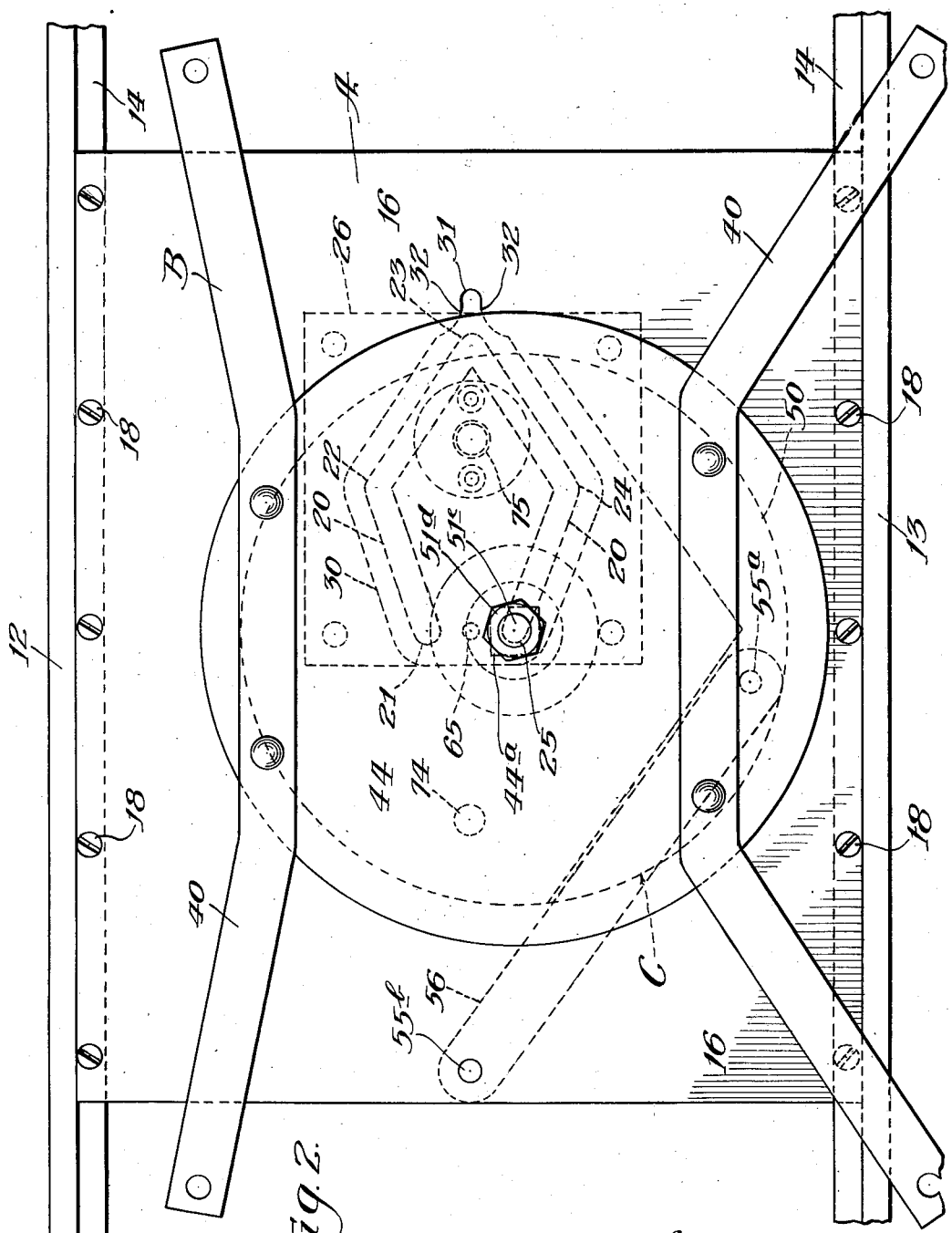

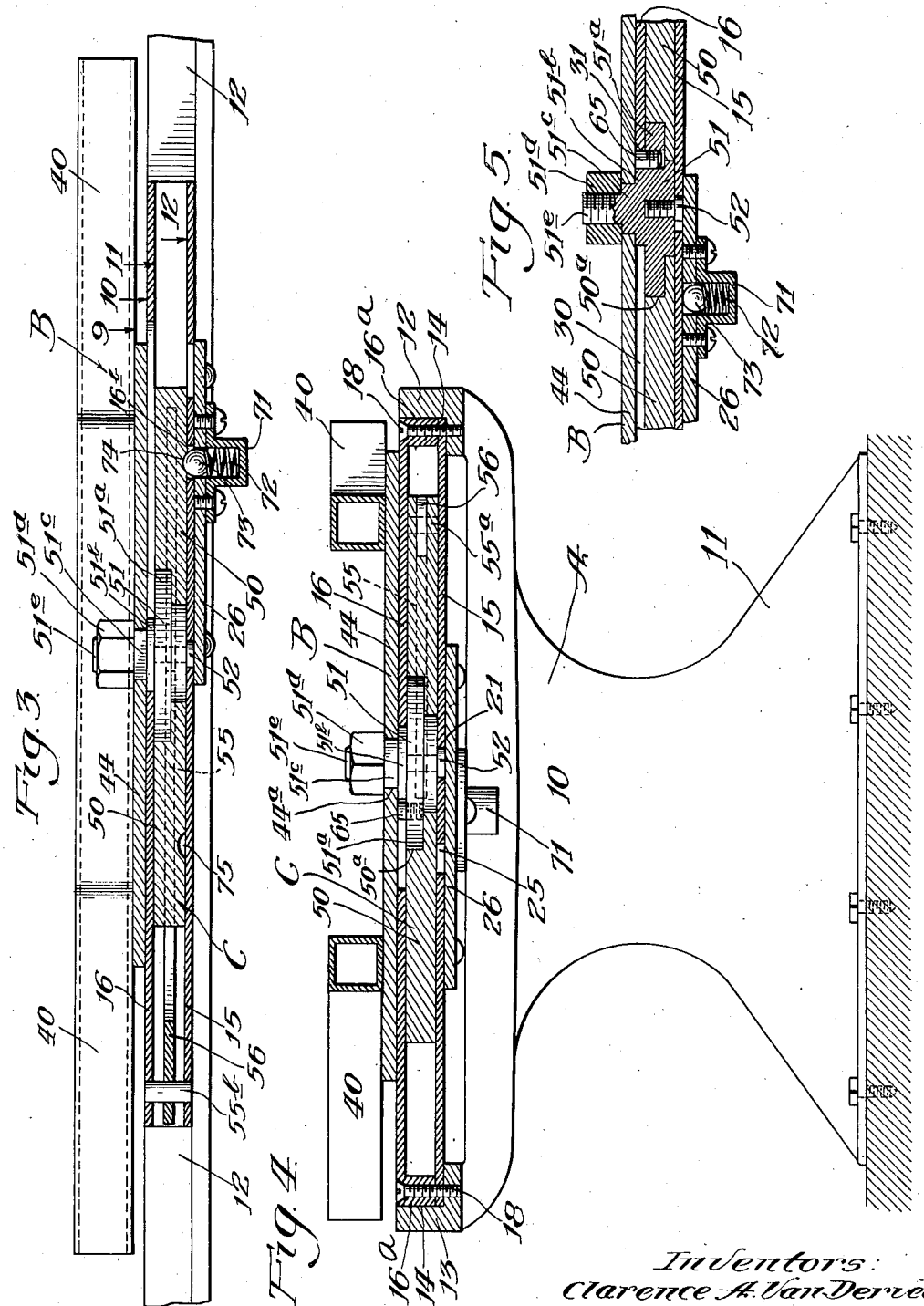

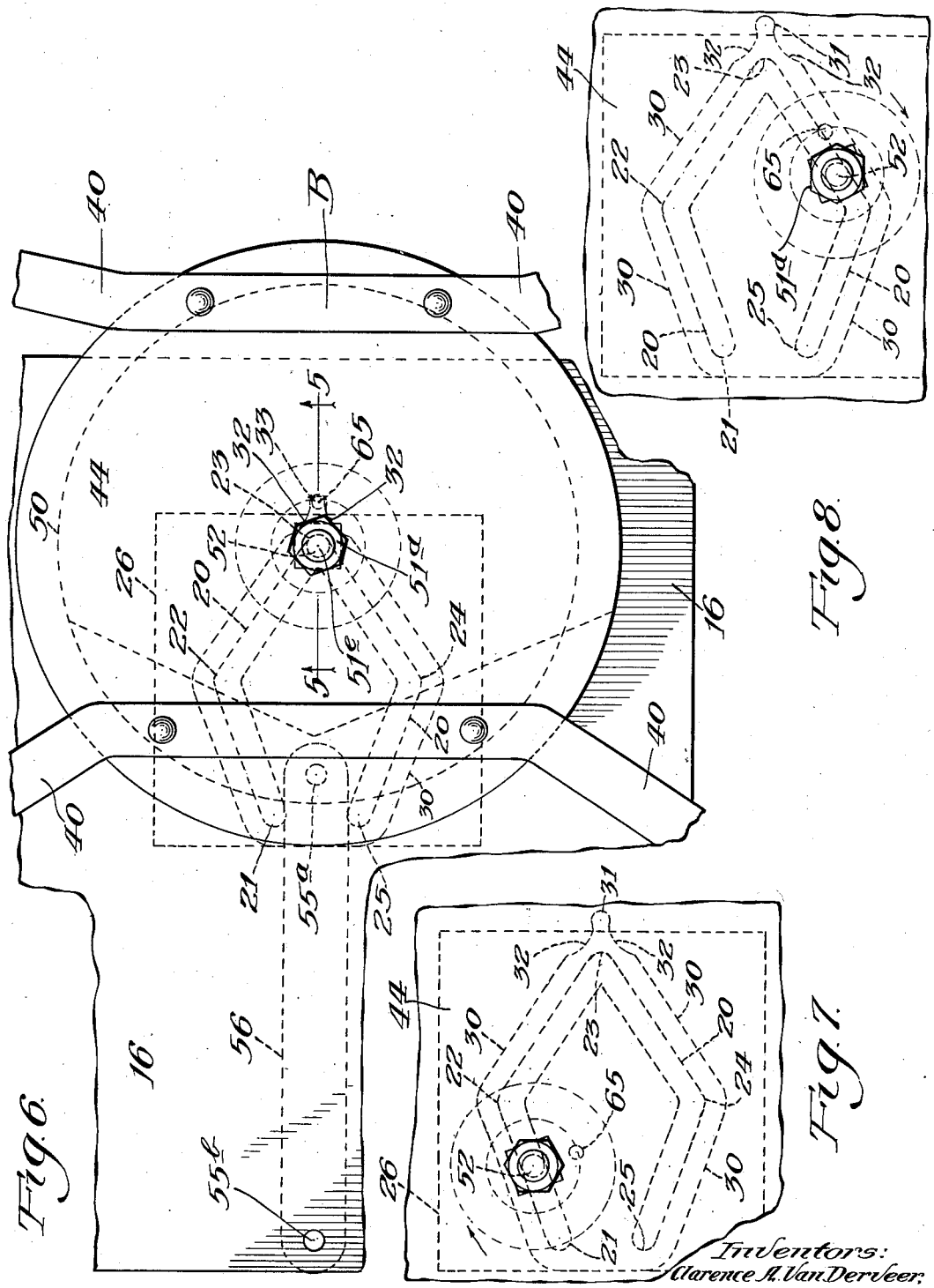

May 14, 1940.  C. A. VAN DERVEER ET AL  2,200,904
REVOLVING CAR SEAT
Filed June 7, 1937  6 Sheets-Sheet 5
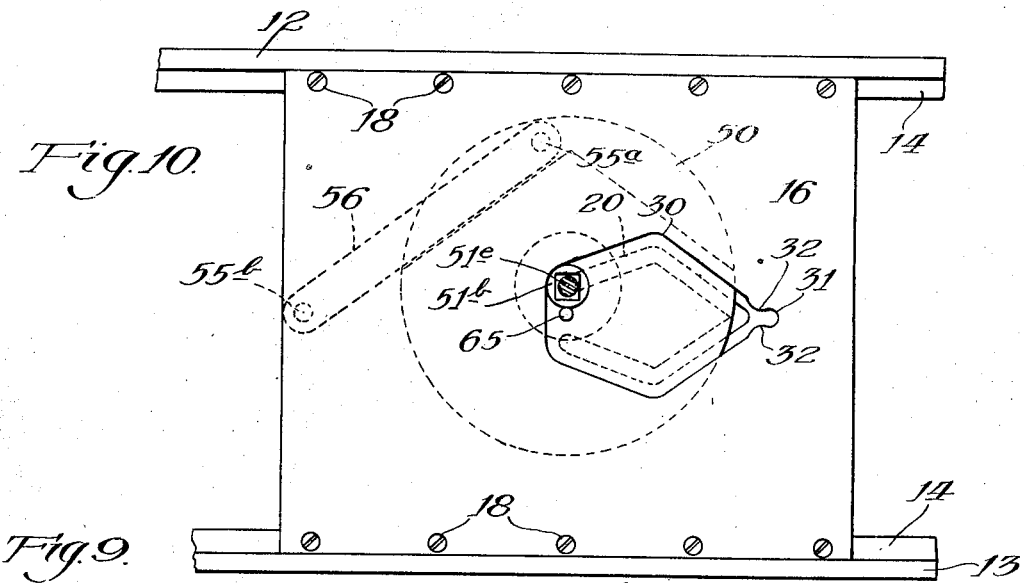
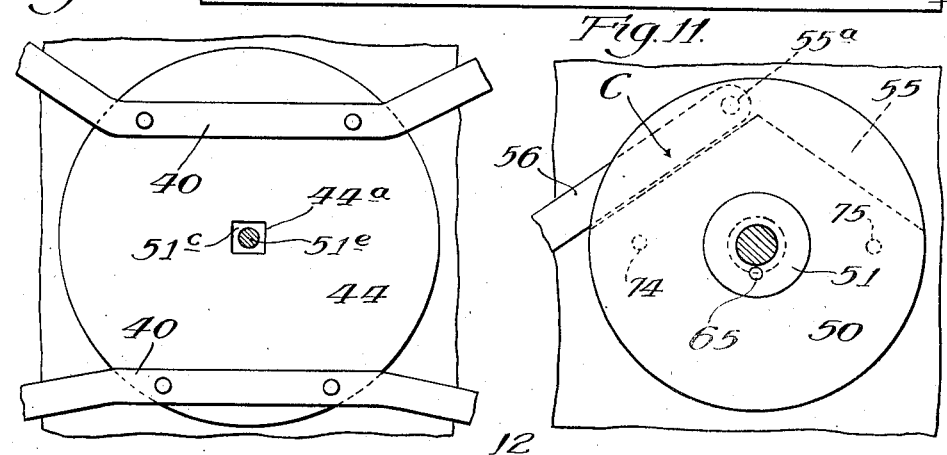

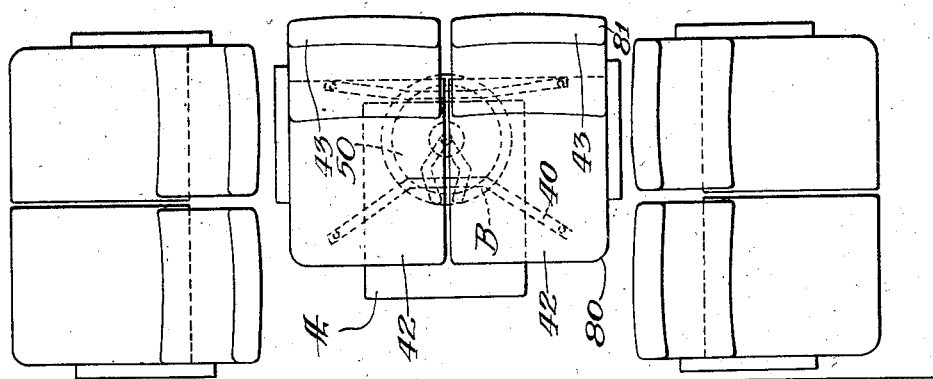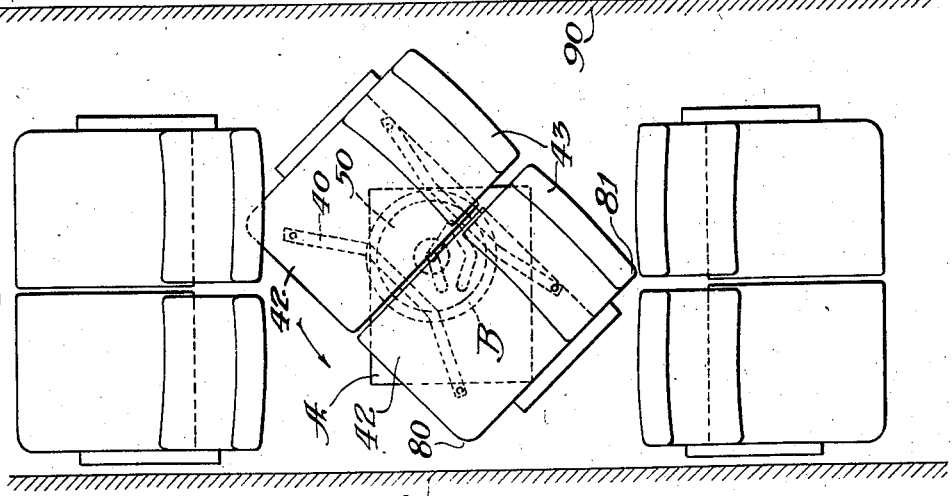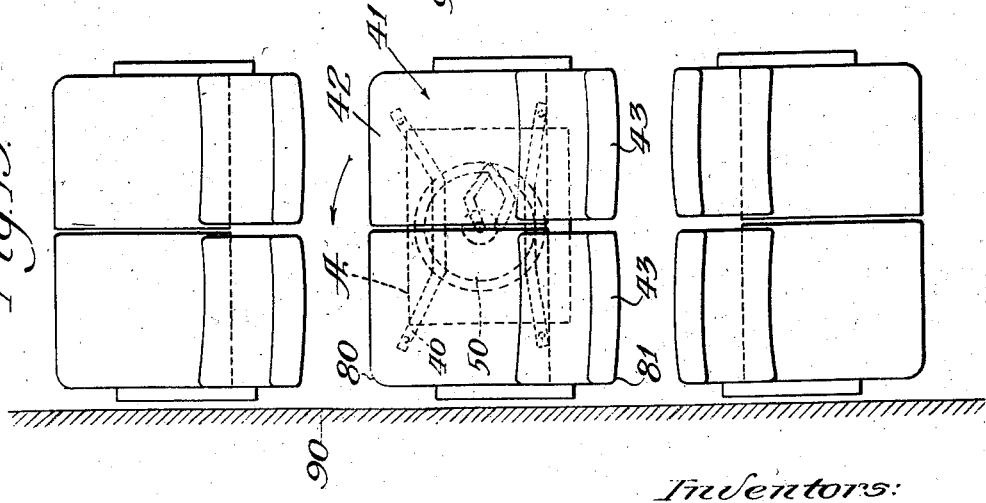

Patented May 14, 1940

2,200,904

UNITED STATES PATENT OFFICE 2,200,904

REVOLVING CAR SEAT

Clarence A. Van Derveer and Ernie J. Beck, Michigan City, Ind., assignors, by mesne assignments, to S. Karpen & Bros., a corporation of Illinois Application June 7, 1937, Serial No. 146,912

8 Claims. (Cl. 155—96)

This invention relates to a seat particularly adapted for use in railroad coaches and buses, but the invention may be employed in other situations.

An object of the invention is to provide an improved seat of sturdy construction which can be reversed in direction and which, in the operation of reversing the seat, will be laterally shifted.

Another object is to provide a seat which may be reversed in a minimum of space so that a number of such reversible seats may be placed at a minimum spacing along the length of a coach or bus. A further object is to provide a seat which will be shifted both laterally and longitudinally as it is being reversed so that the corners of the chair will not strike against the side of the coach in turning, and also so that the corners of the chair will not strike against an adjoining chair back as the seat is being turned to reversed position.

Other objects will appear as the specification proceeds.

A preferred embodiment of the invention is illustrated in the accompanying drawings in which—

Fig. 1 is a plan view of the improved mechanism, the structure being shown in position to support a chair in normal position facing forwardly; Fig. 2, a plan view similar to Fig. 1 but showing the structure after it has been reversed in direction and adapted to support a chair facing rearwardly; Fig. 3, a broken sectional view in elevation, the section being taken as indicated at line 3—3 of Fig. 1; Fig. 4, a sectional view in elevation, the section being taken as indicated at line 4—4 of Fig. 1; Fig. 5, a detail sectional view showing the guide pin in engagement with the base socket, the section being taken as indicated at line 5—5 of Fig. 6; Fig. 6, a broken plan view showing the position of the disk and guide link after the seat has been turned through one-fourth revolution; Fig. 7, a broken plan view showing the positions of the stud and guide pin just after rotation is first started; Fig. 8, a broken plan view showing the positions of the stud and guide pin after rotation has continued more than one quarter revolution from the starting position shown in Fig. 1; Fig. 9, a broken plan sectional view taken as indicated at arrow 9 of Fig. 3; Fig. 10, a plan sectional view taken as indicated at arrow 10 of Fig. 3; Fig. 11, a broken plan sectional view taken as indicated at arrow 11 of Fig. 3; Fig. 12, a broken plan sectional view taken as indicated at arrow 12 of Fig. 3; Fig. 13, a plan view showing the improved seat mounted between adjacent seats in a railway coach; Fig. 14, a view as shown in Fig. 13 but showing the seat rotated through one-eighth revolution; and Fig. 15, a view similar to Fig. 13 but showing the seat rotated through one-quarter revolution.

In the preferred embodiment illustrated, A designates a base; B, a seat supporting structure supported on base A; and C, means for shifting structure B as it is rotated.

The base A comprises a base frame 10 of any suitable construction. As here shown frame 10 includes a pair of legs or standards 11 which may be bolted to the floor of a railway coach or bus. At the top of frame 10 are the spaced rails 12 and 13 at the front and rear, respectively, of the base. Each of these rails contains an inside groove 14 into which the base plates may be received.

The base plates comprise a lower plate 15 and an upper plate 16, these plates being secured in spaced relation and held within grooves 14 in the base frame. Between the front and rear edges of these plates are spacing strips 16a secured to the lower plate. Screws 18 extend through plates 15 and 16 and serve to secure these plates to rails 12 and 13. However, these plates may be secured in any suitable manner.

Lower plate 15, shown more clearly in Fig. 12, is rectangular in form and contains a guide track 20. From its one end 21, track 20 extends laterally and forwardly of plate 15 in a substantially straight path to the character 22, and from here extends laterally and rearwardly to its extreme lateral point 23. From 23, the track extends backwardly in a reverse lateral direction and rearwardly of the plate to the point indicated by character 24, and from 24 extends forwardly of the base to its other end 25. The ends 21 and 25 of this track are substantially in the same lateral position.

This track may be conveniently formed by cutting a slot in plate 15 along the somewhat diamond-shaped outline just described, and then riveting or otherwise securing a reinforcing plate 26 on the underside of plate 15. The walls of this slot together with a bottom formed by reinforcing plate 26 provides the groove or track 20 by which the movements of the seat are guided, as will appear more clearly later in this description.

The upper plate 16, shown in detail in Fig. 10, is coextensive with plate 15 and is provided with an opening 30 just above track 20. Opening 30 is of substantially the same form as is track 20, but at its extreme lateral edge this opening is elongated to form the socket 31. The neck 32 of this socket has curved edges which serve as smooth shoulders for engaging a guide pin as the seat is rotated.

The chair-supporting structure B includes a pair of arms 40 which are attached to the underside of a chair 41 (Fig. 13) having a seat portion 42 and back portion 43. Any type of chair or supporting arms may be used as may be desired. As here shown the arms 40 are attached to a supporting plate 44 which rests flatly on top of upper base plate 16.

The means C for moving structure B laterally of the base includes a guide disk 50 which extends between plates 15 and 16 and substantially fills the space between these plates. For fixedly securing this disk with the structure B, we provide a center piece 51 which may have its disk portion 51a expanded into opening 50a of the disk 50 or may be otherwise secured to this disk. Above portion 51a the piece 51 has a shoulder 51b above which is a square portion 51c which is received within a square opening 44a in the supporting disk 44. The supporting disk 44 is held down tight against shoulder 51c by a nut 51d. Protruding at the bottom of piece 51 is the stud 52 which is secured within a central opening in this piece. It is understood that any suitable arrangement may be resorted to for fixedly securing the chair supporting structure B with disk 50 and for providing the downwardly extending stud 52.

Disk 50 is provided with a groove 55 extending inwardly of its edge along one side, and a guide link 56 extends within this groove. A pivot pin 55a extends vertically through disk 50 at an edge portion to pivotally connect this one end of link 56 eccentrically of disk 50. The other end of link 56 is pivotally connected with the base by pin 55b extending between plates 15 and 16.

Disk portion 51a of piece 51, which may be considered a part of the disk structure, is equipped at one side with an upwardly extending lug or pin 65 which is of such size as to engage socket 31 of base plate 16 with ample clearance. The function of this pin upon engaging socket 31 will be more clearly understood after the explanation of the operation of the seat.

With the chair in its normal position adjacent the side of a coach and facing forwardly as shown in Fig. 13, the operating mechanism will be in the position shown in Fig. 1. It will be noted that stud 52 is engaging track 20 at its end 21, pin 65 is in a position directly rearward of the axis of the stud, and pin 55a connecting link 56 is in a forward position. When the chair has been reversed and is in its normal position adjacent the side of the coach and facing rearwardly, the operating mechanism will be in the position shown in Fig. 2. Here it will be noted that stud 52 is engaging track 20 at its other end 25, pin 65 is in a position directly forward of the axis of the stud, and pin 55a is in a rearward position.

For locking the seat in its normal position we provide the spring housing 71 which is secured to the underside of bottom plate 26, and contains a spring 72 which urges a ball 73 through an opening 16b in plate 15 and against disk 50.

When the chair is facing forwardly a small socket 74 on the underside of disk 50 engages ball 73 and by reason of this engagement releasably holds the chair-supporting structure in this position. Another small socket 75 on the opposite side of disk 50 is adapted to engage ball 73 when the direction of the seat has been reversed so as to releasably hold the chair-supporting structure in this reversed position. It is apparent that any substantial force tending to turn disk 50 will depress ball 73 against spring 72 and release this engagement.

The movement of the mechanism as the chair is being reversed in direction will now be described.

If the chair is turned in a counter clockwise direction from its normal position facing forwardly as shown in Fig. 13 in an attempt to turn the front of the seat toward the side 90 of the coach, this will cause rotation of the whole chair-supporting structure B about an axis through stud 52. Supporting plate 44 and disk 50 will rotate in unison about this axis. Referring now particularly to Fig. 1, it is apparent that pin 65 secured in disk 50 is blocked against movement longitudinally of the guide link 56, so rotation of the disk about an axis through stud 52 serves also to move the disk about pin 55a as a pivot, stud 52 moving along track 20. Disk 50 and the whole structure B rotates about an axis through stud 52 and also laterally of the base in a course determined by the path of track 20.

When the chair has been rotated through substantially one-eighth revolution the stud 52 will have traveled along track 20 from its end 21 to its most forward point 22. During this travel the chair moves laterally to one side of the base and also forwardly of the base. As shown more clearly in Fig. 14, the front corner 80 of the seat portion 42 will now easily clear the side of the coach, and also the top corner 81 of the back portion 43 will now easily clear the back of the adjacent seat. It may here be observed that had the seat not been shifted laterally corner 80 of the chair would have struck the side of the coach, and had not the seat been shifted forwardly of the base corner 81 of the back would have struck the adjoining seat and prevented reversal.

Thus far the movement of disk 50 has been mainly a pivotal movement about pin 55a, but upon continued rotation of structure B about the axis through stud 52 guide link 56 will be turned about pin 55b, which action tends to push stud 52 laterally and rearwardly along track 20 to the extreme end of the forward path of the track as shown more clearly in Fig. 6. This extreme lateral position of the structure will be reached after the chair has been rotated through substantially 90°, or one-quarter revolution.

Without the action of pin 65 and socket 31 it was found as a practical matter that after the seat had been shifted to the extreme lateral position as above described further rotation of the chair would cause the stud 52 to retrace its path and follow backwardly along the forward path just traveled. This condition would be unsatisfactory because during the latter quarter revolution of the reversal the seat would be again shifted forwardly of the base and would be sure to strike its back against the seat in front of it.

The action of pin 65 and socket 31 in directing the stud 52 into the rearward path of track 20 may be better understood by particular reference to Figs. 6, 7 and 8 of the drawings. Upon initial rotation of the chair in a counter clockwise direction the stud and pin will begin to move as indicated at Fig. 7. When the chair has rotated almost one-quarter revolution the pin 65 will have turned to a position at one side of stud 52 to enter socket 31. In this position, shown in Fig. 6, rotation of the chair causes disk 50 to pivot about pin 65 to carry stud 52 over into the rearward path of the track. Continued rotation of the chair causes the pin 65 to be withdrawn from the socket and stud 52 to follow the rearward path of track 20 rearwardly and laterally to point 24, and then forwardly and laterally to the end 25 of the track, the latter movement being principally a pivoting movement about pin 55ª.

The above operation of the seat takes place when the chair is reversed from a position facing forwardly to a position facing rearwardly. It will be observed that during the first quarter revolution of this turning movement the seat is shifted forwardly to allow the back of the chair to clear the chair next adjacent toward the rear, and during the latter quarter revolution of the turning movement the seat is shifted rearwardly to allow the back of the chair to clear the chair next adjacent toward the front of the car. This action makes it possible to place the seats along the side of the car at closer spacing while still permitting the seats to be turned in reversal.

Any tendency of the chair-supporting structure to tilt or wobble on the base is entirely counteracted by the engagement of disk 50 and plate 44 with the base plates. Disk 50 is snugly held between base plates 15 and 16, and top base plate 16 is held snugly between plate 44 and disk 50. By making use of the edge groove 55 in disk 50, the guide link 56 may be connected to the disk though the disk is slidably engaged on each of its sides with one of the base plates.

It is understood that the specific form of track 20 may be varied as may be desired to give the wanted movement of the supporting structure along the base. That is, portions of the track may be curved instead of straight as here illustrated, or the extreme forward and rearward points may be reached at other than 45° and 135° as in the embodiment shown and described.

Many changes may be made in the construction without departing from the spirit of our invention. The foregoing detailed description has been given for clearness of understanding only, and no unnecessary limitations should be understood therefrom, but the appended claims should be construed as broadly as permissible, in view of the prior art.

We claim:

1. In combination, a base equipped with a pair of spaced plates, a chair-supporting structure rotatably supported on said base, a disk secured to said structure and in slidable engagement with both of said plates, said disk being provided with an edge groove, a guide link having its one end pivotally connected within said edge groove and having its other end pivotally connected to said base, and means for guiding said structure in movement laterally of said base as said structure is rotated.

2. In combination, a base equipped with a pair of spaced plates comprising an upper plate and a lower plate, a chair-supporting structure rotatably supported on said base, said upper plate having an opening therein and said lower plate being equipped with a track which extends laterally in a rearward path, a stud fixed to said chair-supporting structure and extending through said opening and engaging said track, a disk fixedly secured to said stud, a link pivotally connected to said base and to said disk, a pin on said disk, and a socket in said uppermost plate adjacent said opening and adapted to receive said pin upon rotation of said chair-supporting structure through substantially 90°, said disk being adapted to pivot about said pin when the pin is within said socket to guide said stud along said track.

3. In combination, a base equipped with a pair of spaced plates comprising an upper and a lower plate, a chair-supporting structure rotatably supported on said base and including a supporting plate slidably engaging said upper plate, said upper plate having an opening therein and having a socket at the lateral edge of said opening, said lower plate being equipped with a guide track extending laterally of said base in a forward path and returning laterally of said base in a rearward path, a disk disposed between and slidably engaging said spaced plates, said disk being provided with an edge groove, a guide link having its one end pivotally secured within said groove and being pivotally connected at its other end to said base, a stud secured to said supporting plate and to said disk and engaging said track, means for resiliently holding said structure in one position, means associated with said structure for engaging said socket after rotation of said structure through substantially 90° for moving said stud into said rearward path, and means for resiliently holding said structure in a reversed position after rotation of said structure through substantially 180°.

4. In combination, a base equipped with a guide track, said track extending laterally along said base in a forward path and returning laterally along said base by a rearward path, a chair-supporting structure rotatably supported on said base, a disk secured with said chair-supporting structure, a stud secured to said disk and engaging said track, a guide link pivotally connected to said base and said disk, said disk and guide link being adapted to move said structure laterally along said track as said structure is rotated, and means associated with said disk for pivotally engaging said base when said link approaches alignment with the center of rotation of said structure, said means being effective through said engagement to prevent return of said stud laterally of said base along said forward path and cause return of said stud laterally along said rearward path upon continued rotation of said chair-supporting structure.

5. In combination, a base equipped with a base plate, said base plate being provided with an enlarged opening therein and with a pivot indentation communicating with said opening, chair-supporting structure rotatably carried by said base plate and including a seat plate resting on said base plate, a disk below said base plate and in contact with the undersurface of said base plate, said disk being connected to said seat plate, and means for moving said seat plate and structure laterally of said base as said structure is rotated, said means including a pivot pin secured to said seat plate and adapted to engage said pivot indentation in said base plate to provide a pivot around which said chair-supporting structure is temporarily moved.

6. In combination, a base equipped with a base plate, said base plate being provided with an opening therethrough and with a pivot indentation communicating with said opening, chair-supporting structure rotatably carried by said base plate and including a supporting seat plate resting on said base plate, a disk below said base plate and in contact with the undersurface of said base plate, said disk being secured to said supporting plate, and means for moving said supporting plate and structure laterally of said base as said supporting structure is rotated, said means including a pivot pin secured to said supporting plate and adapted to withdrawably engage said pivot indentation to provide a temporary pivot for said supporting plate.

7. In combination, a base equipped with a base plate, said base plate being provided with an enlarged opening and at least one pivot indentation communicating therewith, chair-supporting structure rotatably carried by said base plate and including a seat plate member resting on said base plate, a disk member below said base plate and in contact with the undersurface of said base plate, and means for moving said seat plate and structure laterally of said base as said structure is rotated, said means including a pin carried by said seat plate and adapted to withdrawably engage said indentation to provide a temporary pivot for said seat plate.

8. In combination, a base provided with a base plate, said base plate having an opening in the top portion thereof and a pivot indentation communicating therewith, chair-supporting structure rotatably carried by said base plate and including a seat plate member resting on said base plate, a disk member below said base plate and in contact with the undersurface of said base plate, means securing said members together, and means for moving said seat plate member and structure laterally and longitudinally of said base as said structure is rotated, said means including a pivot member carried by said seat plate and adapted to be shifted into contact with said indentation as the structure is rotated and to serve as a temporary pivot about which said seat plate swings as the chair-supporting structure is rotated, said pin upon further rotation, leaving said indention and moving with said chair-supporting structure.

CLARENCE A. VAN DERVEER.
ERNIE J. BECK.